(12) United States Patent
Ramabhadran et al.

(10) Patent No.: US 9,585,207 B2
(45) Date of Patent: Feb. 28, 2017

(54) SYSTEM AND METHOD FOR ACHIEVING PRECISE REGULATION OF MULTIPLE OUTPUTS IN A MULTI-RESONANT LED DRIVER STAGE

(71) Applicant: GENERAL ELECTRIC COMPANY, Schenectady, NY (US)

(72) Inventors: Ramanujam Ramabhadran, Niskayuna, NY (US); Gang Yao, Twinsburg, OH (US)

(73) Assignee: General Electric Company, Niskayuna, NY (US)

( * ) Notice: Subject to any disclaimer, the term of this patent is extended or adjusted under 35 U.S.C. 154(b) by 190 days.

(21) Appl. No.: 14/328,909

(22) Filed: Jul. 11, 2014

(65) Prior Publication Data

US 2016/0014858 A1    Jan. 14, 2016

(51) Int. Cl.
    H05B 33/08    (2006.01)

(52) U.S. Cl.
    CPC ...... H05B 33/0812 (2013.01); H05B 33/0815 (2013.01)

(58) Field of Classification Search
    None
    See application file for complete search history.

(56) References Cited

U.S. PATENT DOCUMENTS

| | | | |
|---|---|---|---|
| 6,369,525 B1 * | 4/2002 | Chang | H02M 3/33561 315/278 |
| 6,836,157 B2 | 12/2004 | Rader et al. | |
| 7,928,670 B2 | 4/2011 | Chen et al. | |
| 8,288,961 B2 | 10/2012 | Chen et al. | |
| 8,487,548 B2 | 7/2013 | Shteynberg et al. | |
| 8,742,685 B1 * | 6/2014 | Nalbant | H05B 33/0827 315/291 |
| 2010/0237799 A1 | 9/2010 | Choi et al. | |
| 2011/0080102 A1 | 4/2011 | Ge et al. | |
| 2011/0316430 A1 | 12/2011 | Cohen et al. | |
| 2012/0062147 A1 | 3/2012 | Fan | |
| 2012/0112657 A1 | 5/2012 | Van Der Veen et al. | |
| 2012/0181940 A1 | 7/2012 | Snelten et al. | |
| 2012/0217884 A1 | 8/2012 | Raykhman et al. | |
| 2012/0217898 A1 * | 8/2012 | Pansier | H05B 33/0815 315/297 |
| 2013/0154484 A1 | 6/2013 | Xu | |
| 2013/0293125 A1 | 11/2013 | Weger et al. | |

OTHER PUBLICATIONS

PCT Search Report and Written Opinion issued in connection with corresponding PCT Application No. PCT/US2015/035903 on Oct. 7, 2015.

(Continued)

*Primary Examiner* — Douglas W Owens
*Assistant Examiner* — Dedei K Hammond
(74) *Attorney, Agent, or Firm* — Pabitra K. Chakrabarti

(57) ABSTRACT

A light emitting diode (LED) driver includes an inverter for converting a DC input signal to a pulsating signal. A multiple output multi-resonant converter generates a first LED string current in response to the pulsating signal, and also generates a second LED string current in response to the pulsating signal. A transistor that may be a FET or BJT operating in its linear region regulates the second LED string current independent of the first LED string current without sacrificing efficiency of the overall power train.

14 Claims, 6 Drawing Sheets

(56) References Cited

OTHER PUBLICATIONS

"LLC Half-Bridge Controller for Multi-String LED Lighting", Texas Instruments, pp. 1-28, May 2011.
"LED Application Design Guide Using Half-Bridge LLC Resonant Converter for 100W Street Lighting" FairChild Semiconductor AN-9729, pp. 1-17, Nov. 16, 2012.
Wu et al., Abstract of "Series-Parallel Auto-Regulated Charge Balancing Rectifier for Multi-Output Light Emitting Diode (LED) Driver", Industrial Electronics, IEEE Transactions on (vol. PP, Issue: 99), pp. 1, Apr. 5, 2013.

\* cited by examiner

SYSTEM AND METHOD FOR ACHIEVING PRECISE REGULATION OF MULTIPLE OUTPUTS IN A MULTI-RESONANT LED DRIVER STAGE

BACKGROUND

The subject matter of this disclosure relates generally to multi-resonant LED drivers, and more particularly, to a system and method for achieving precise regulation of multiple outputs in a multi-resonant light emitting diode (LED) driver stage.

Multi-resonant converters and variants thereof are a very efficient means for controlling a wide range of currents through an LED load. FIG. 1 is a schematic diagram illustrating a basic LED drive 10 that is implemented with a multi-resonant variant converter 12. The LED drive 10 can drive a single string of LEDs, or series-parallel arrangements of LEDs that are represented in FIG. 1 by a single diode (D1) 14. The single diode 14 can be replaced by a string of LEDs in series or by series parallel arrangements of LEDs. The LED current 15 is usually sensed with a sense transformer placed at a current sense point 16 on the secondary side of the multi-resonant converter 12. The main isolation transformer 18 is represented as element T1 in FIG. 1. Although such converters may be useful to provide precise regulation through a load, known multi-resonant converters and their variants are not capable of providing precise regulation of multiple outputs such as required for multi-stringed LEDs without sacrificing efficiency or the undesirable addition of a significant number of parts.

FIG. 2 is a simplified schematic diagram illustrating a basic half bridge resonant converter 100 with a multi-resonant drive 102. The half bridge resonant converter 100 can drive a single string of LEDs, or series-parallel arrangements of LEDs that are represented in FIG. 2 by a single diode 104. The single diode 104 can be replaced by a string of LEDs in series or by series parallel arrangements of LEDs. The LED current is usually sensed with a sense transformer placed at a current sense point on the secondary side of the multi-resonant drive 102. Although such converters may be useful to provide precise regulation through a load, these known multi-resonant converters and their variants are not capable of providing precise regulation of multiple outputs such as required for multi-stringed LEDs without sacrificing efficiency or the undesirable addition of a significant number of parts, as stated herein.

Mixed light systems, such as blue mixed with red LEDs, often require precise control over a second output while maintaining control of the first output. It would be beneficial and advantageous to provide a system and method that employs a multi-resonant converter in which a second output can be regulated without sacrificing the efficiency of the overall power train.

BRIEF DESCRIPTION

According to one embodiment, a light emitting diode (LED) driver comprises:

an inverter for converting a DC input signal to a pulsating signal;

a multi-resonant converter for generating via a first multi-resonant converter output, a first LED string current in response to the pulsating signal, and for generating via a second multi-resonant converter output, a second LED string current in response to the pulsating signal; and at least one transistor selected from field effect transistor (FET) and a bipolar junction transistor (BJT), wherein the at least one transistor operates in its linear region to regulate the second LED string current independent of the first LED string current, and further wherein an LED load on the first multi-resonant converter output imposes a substantially fixed voltage that enables a voltage on the second multi-resonant converter output to be independently regulated over a full load range, wherein the substantially fixed voltage is defined as an LED diode forward voltage drop plus an inherent resistive voltage drop in the LED diode. It can be appreciated that the resistive drop inherent in an LED is typically within 10% of the forward drop voltage of the LED.

According to another embodiment, a light emitting diode (LED) driver comprises:

an inverter for converting a DC input signal to a pulsating signal;

a multi-resonant converter comprising a transformer with a primary winding coupled to the inverter, a first secondary winding for generating a first LED string current in response to the pulsating signal, and a second secondary winding for generating a second LED string current in response to the pulsating signal; and at least one transistor selected from field effect transistor (FET) and a bipolar junction transistor (BJT), wherein the at least one transistor operates in its linear region to regulate the second LED string current independent of the first LED string current.

According to yet another embodiment, a light emitting diode (LED) driver comprises:

an inverter for converting a DC input signal to a pulsating signal;

a multi-resonant converter comprising a transformer with a primary winding coupled to the inverter, a first secondary winding for generating a first LED string current in response to the pulsating signal, and a second secondary winding for generating a second LED string current in response to the pulsating signal, wherein the second LED string is responsive to a corresponding LED string voltage, and further wherein the second secondary winding comprises a turns ratio relative to the primary winding to generate the corresponding LED string voltage; and at least one transistor selected from a field effect transistor (FET) and a bipolar junction transistor (BJT) operating in its linear region to regulate the second LED string current independent of the first LED string current.

According to still another embodiment, a light emitting diode (LED) driver comprises:

an inverter for converting a DC input signal to a pulsating signal;

a multi-resonant converter comprising a transformer with a primary winding coupled to the inverter, a first secondary winding for generating a first LED string current in response to the pulsating signal, and a second secondary winding for generating a second LED string current in response to the pulsating signal, wherein the second LED string is responsive to a corresponding LED string voltage, and further wherein the second secondary winding generates a scaled output voltage to provide the corresponding LED string voltage; and at least one transistor selected from a field effect transistor (FET) and a bipolar junction transistor, wherein the at least one transistor operates in its linear region to regulate the second LED string current independent of the first LED string current.

According to still another embodiment, a light emitting diode (LED) driver comprises:

an inverter for converting a DC input signal to a pulsating signal;

a multi-resonant converter comprising a transformer with a primary winding coupled to the inverter, a first secondary winding for generating a first LED string current in response to the pulsating signal, and a second secondary winding for generating a second LED string current in response to the pulsating signal; and a buck regulator connected to the second secondary winding for regulating the second LED string current independent of the first LED string current.

DRAWINGS

These and other features, aspects, and advantages of the present invention will become better understood when the following detailed description is read with reference to the accompanying drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 3:
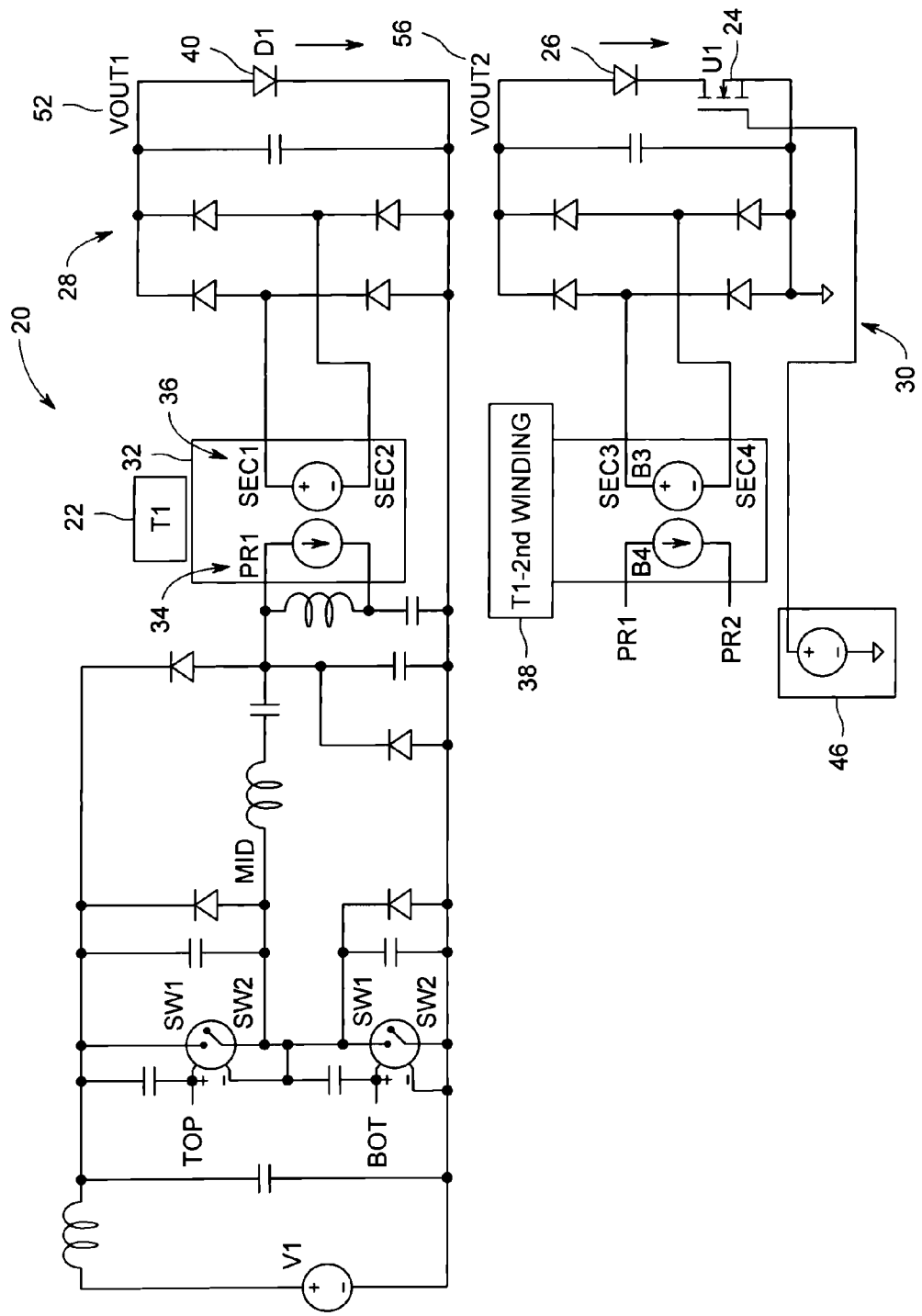
FIG. 3 is a schematic diagram illustrating a multiple output LED drive with a multi-resonant variant converter that employs a field effect transistor (FET) to achieve precise control of currents in an LED string, according to one embodiment.

FIG. 3 is a schematic diagram illustrating a multiple output LED drive 20 with a multi-resonant variant converter 22 that employs a field effect transistor (FET) 24 to achieve precise control of currents in an LED string 26, according to one embodiment. The principles described herein are not limited to FET transistors, and other types of transistors, such as, without limitation, bipolar junction transistors (BJTs), may just as easily be employed. More specifically, the multiple output LED drive 20 comprises two output circuits 28, 30. Output circuit 30 has its current regulated in a fashion that does not sacrifice efficiency of the overall power train/LED drive 20.

The multi-resonant variant converter 22 comprises an isolation transformer 32 that includes a primary winding 34 and a pair of secondary windings 36, 38. Secondary winding 36 functions to supply current to a first load comprising an LED string 40, while secondary winding 38 functions to supply current to a second load comprising the LED string 26.

According to one embodiment, the secondary winding 38 comprises a turns ratio relative to the primary winding 34 that can be adjusted to provide a rough voltage corresponding to the string voltage of the second LED string 26. It can be appreciated that the second LED string voltage may have a different forward voltage drop relative to the first LED string voltage, based on the particular application.

Figure 1:
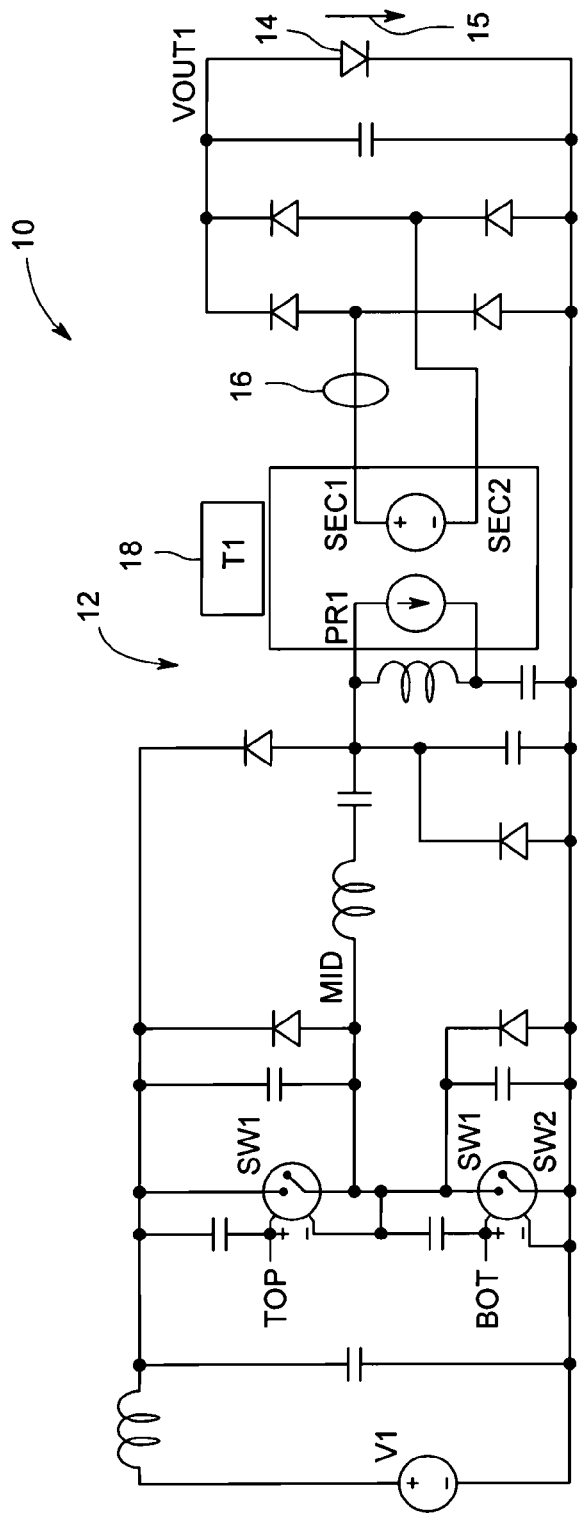
FIG. 1 is a schematic diagram illustrating a basic LED drive with a multi-resonant variant converter.
Figure 2:
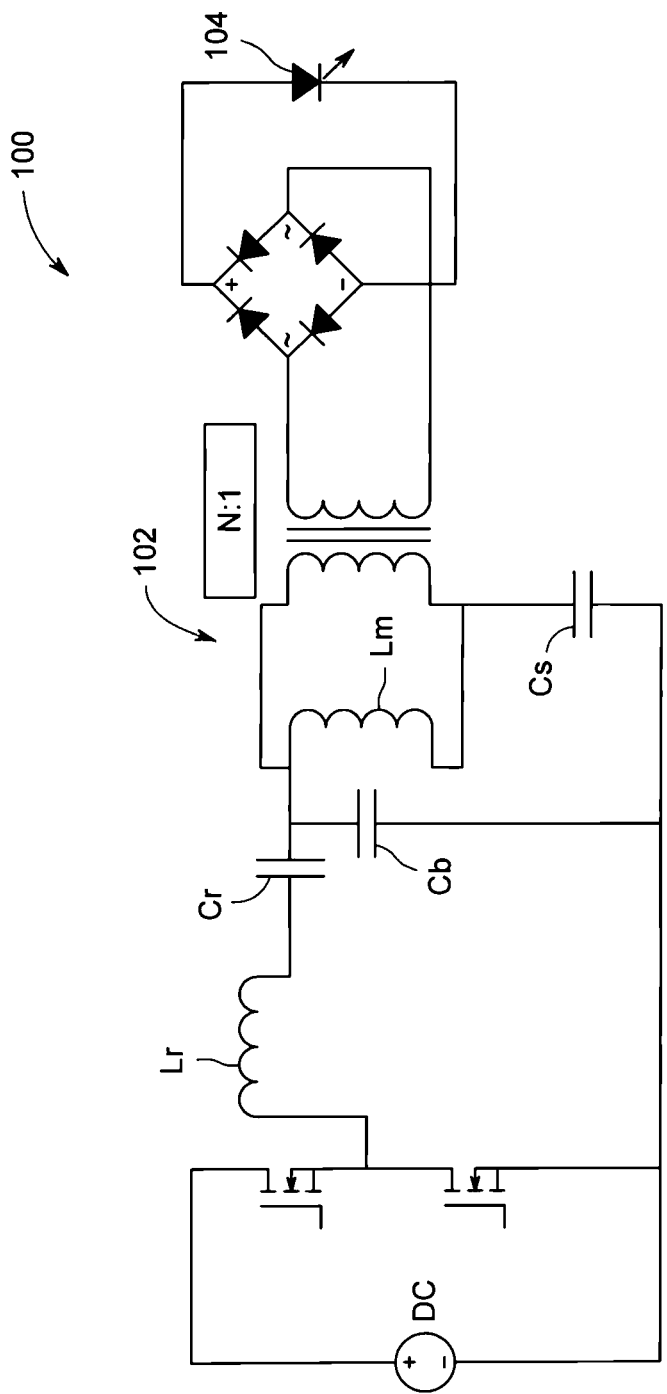
FIG. 2 is a simplified schematic diagram illustrating the basic half bridge resonant converter with a multi-resonant drive depicted in FIG. 1.

The transistor 24 may be, for example, without limitation, an FET, that is placed in series with the second LED string 26. According to one embodiment, FET 24 functions as a ground referenced FET such as depicted in FIG. 2, to regulate the current through the second LED string 26 more precisely by operating in its linear region. The ground reference may be a floating ground reference 46. Since the voltage drop across the FET 24 is small, precise regulation of the second LED string current can be obtained without sacrificing excessive power that is typical of a linear regulator. The multiple output LED drive 20 that functions with the multi-resonant variant converter 22 thus preserves the efficiency of the multi-resonant converter 22 while achieving current regulation over multiple output loads/FET strings 40, 26. According to one embodiment, the first stage that includes FET string 40 can be controlled in standard fashion with a traditional control loop, while the second stage that includes FET string 26 is simultaneously controlled using FET 24 as described herein.

In summary explanation, the multiple output LED drive 20 with a multi-resonant variant converter 22 employs a multiple output version of the same LLD converter structure with precise control of currents in each string 40, 26. A second winding 38 is added to the multi-resonant converter transformer 32, and a series transistor such as a FET 24 is placed at the end of the second LED string 26 to regulate the second LED string current precisely without incurring an excessive voltage drop across the FET 24, thus substantially preserving the efficiency of the multi-resonant variant converter 22.

Figure 4:
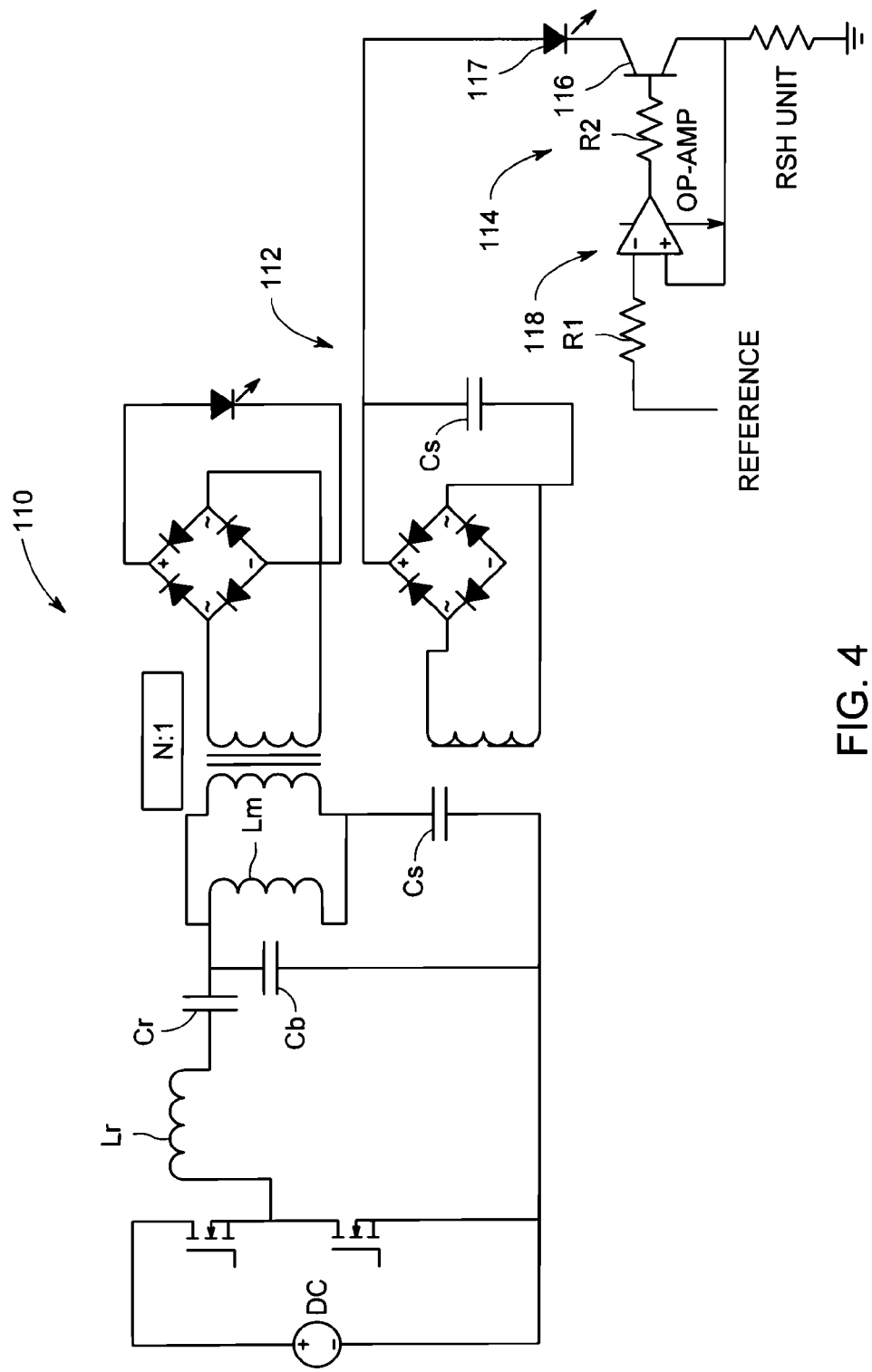
FIG. 4 is a simplified schematic diagram illustrating the half bridge multi-resonant converter with auxiliary output for LED drive plus linear regulator depicted in FIG. 3.

FIG. 4 is a simplified schematic diagram illustrating a half bridge multi-resonant converter 110 with auxiliary output 112 for LED drive plus linear regulator 114, according to another embodiment. The half bridge multi-resonant converter 110 is similar to the multiple output LED drive 20 with a multi-resonant variant converter 22 that employs a field effect transistor (FET) 24 to achieve precise control of currents in an LED string 26 shown in FIG. 3. The linear regulator 114 can however be seen to employ a bipolar junction transistor (BJT) 116 to achieve precise control of currents in a corresponding LED string 117. The BJT 116 is referenced to ground via a reference voltage circuit 118 according to one embodiment.

Figure 5:
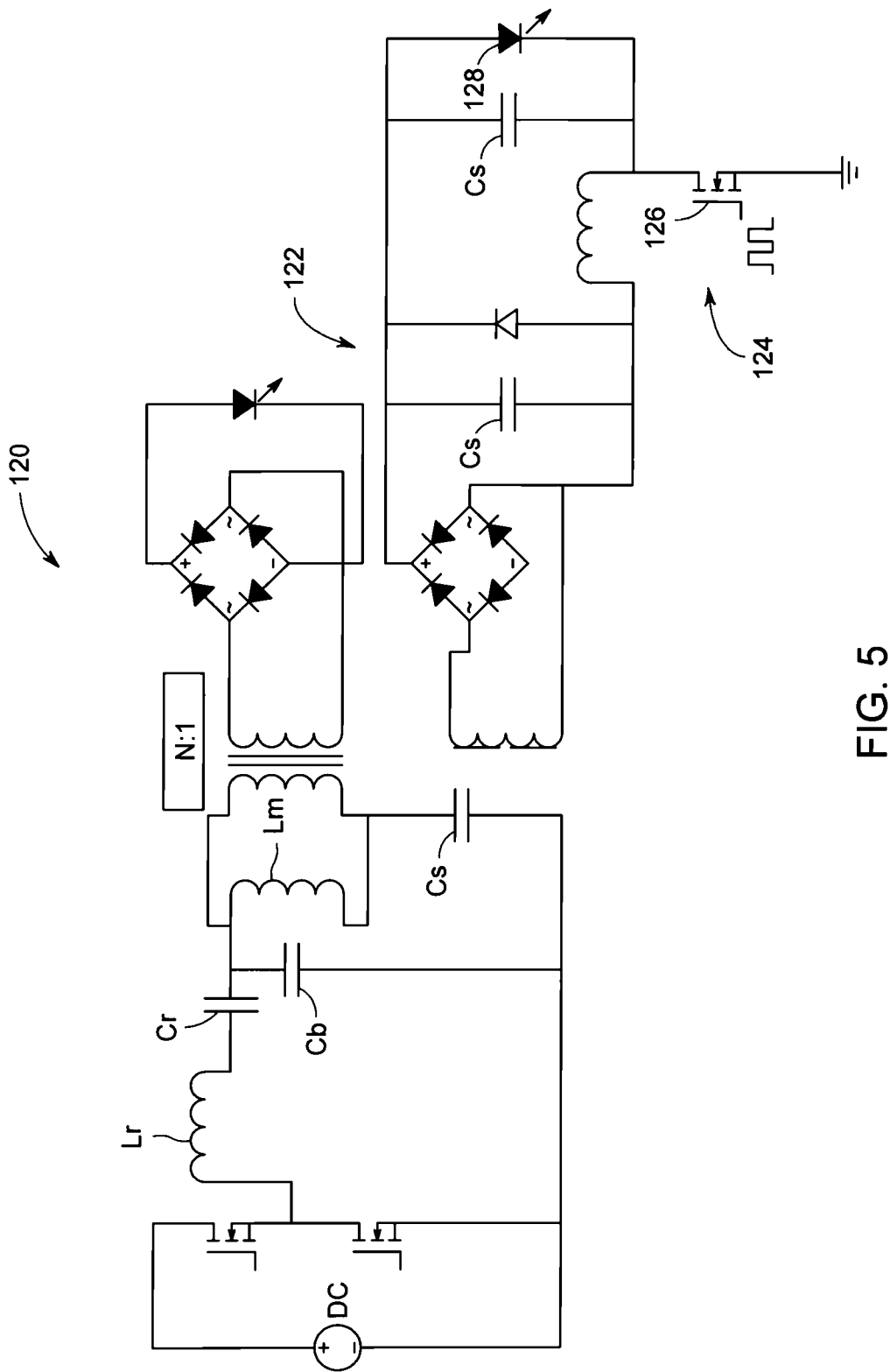
FIG. 5 is a simplified schematic diagram illustrating a half bridge multi-resonant converter with auxiliary output for LED drive plus a buck regulator, according to one embodiment.

FIG. 5 is a simplified schematic diagram illustrating a half bridge multi-resonant converter 120 with auxiliary output for LED drive 122 plus a buck regulator 124, according to one embodiment. Using principles similar to those described herein, the buck regulator 124 employs an FET 126 to achieve precise control of currents in an LED string 128. The FET 126 in this embodiment however, operates using pulse width modulation (PWM) techniques to control the linearity.

Figure 6:
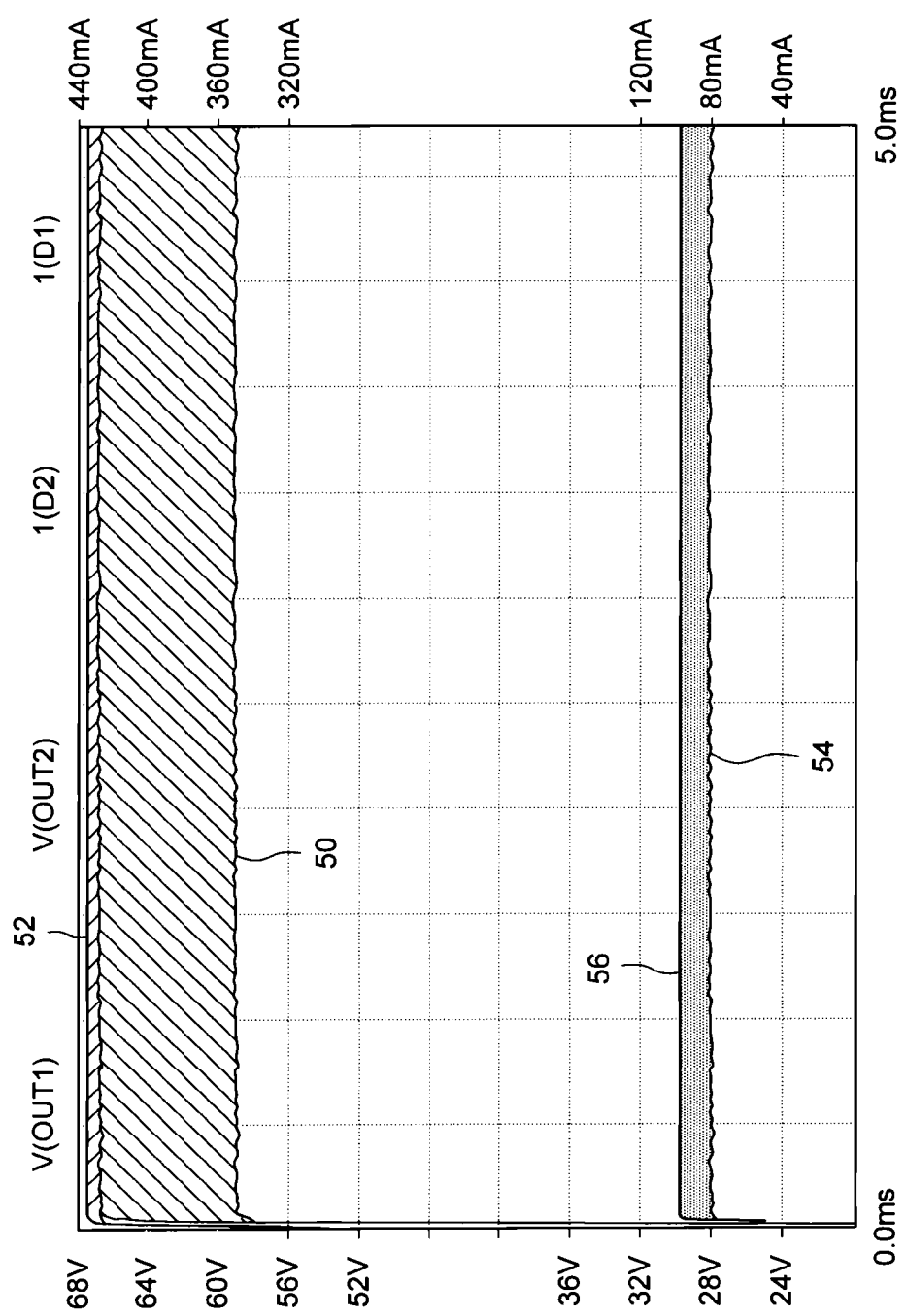
FIG. 6 is a graph illustrating a current control through two LED strings using the multiple output LED drive depicted in FIG. 2.

FIG. 6 is a graph illustrating a simulated current control through the two LED strings 40, 26 using the multiple output LED drive 20 with the multi-resonant variant converter 22 depicted in FIG. 2. Although the reference to the gate of the MOSFET 24 is set to a desired level as depicted by voltage source 46, the gate reference in reality would comprise the output of a feedback loop, where the voltage to the gate would be regulated just as done in a linear regulator.

The top waveform 50 illustrates a current of 400 mA through the first LED string 40. The voltage 52 of the first LED string 40 is set at 67V. The bottom waveform 54 illustrates the current through the second LED string 26. The second LED string current is generated at a smaller voltage 56, but the current through the second LED string 26 is precisely regulated through the MOSFET 24 to a desired level.

While the invention has been described in terms of various specific embodiments, those skilled in the art will recognize that the invention can be practiced with modification within the spirit and scope of the claims.

The invention claimed is:

1. A light emitting diode (LED) driver comprising:
an inverter for converting a DC input signal to a pulsating signal;
a multiple output multi-resonant converter for generating via a first multi-resonant converter output, a first LED string current in response to the pulsating signal, and for generating via a second multi-resonant converter output, a second LED string current in response to the pulsating signal; and
at least one transistor selected from a field effect transistor (FET) and a bipolar junction transistor (BJT), wherein the at least one transistor is biased when activated to operate only in its linear region to regulate the second LED string current independent of the first LED string current, and further wherein an LED load on the first multi-resonant converter output imposes a substantially fixed voltage that enables a voltage on the second multi-resonant converter output to be independently regulated over a full load range, wherein the substantially fixed voltage is defined as an LED diode forward voltage drop plus an inherent resistive voltage drop in the LED diode.

2. The LED driver according to claim 1, wherein the at least one transistor comprises an FET in series with at least one LED receiving the second LED current.

3. The LED driver according to claim 1, wherein the at least one transistor comprises an FET having a gate that is driven via a voltage signal to control the second LED current.

4. The LED driver according to claim 1, wherein the multiple output multi-resonant converter comprises a transformer comprising a primary winding and a plurality of secondary windings.

5. The LED driver according to claim 4, wherein at least one secondary winding comprises a turns ratio relative to the primary winding such that the at least one secondary winding generates a voltage equal to a string voltage associated with the second LED string independent of a string voltage associated with the first LED string.

6. The LED drive according to claim 1, wherein the multiple output multi-resonant converter comprises a transformer for generating a first LED string voltage, and further for generating a scaled voltage relative to the first LED string voltage such that the scaled voltage equals a voltage drop associated with the second LED string, and further wherein the first LED string voltage is different from the scaled voltage.

7. A light emitting diode (LED) driver comprising:
an inverter for converting a DC input signal to a pulsating signal;
a multi-resonant converter comprising a transformer with a primary winding coupled to the inverter, a first secondary winding for generating a first LED string current in response to the pulsating signal, and a second secondary winding for generating a second LED string current in response to the pulsating signal, wherein the second LED string is responsive to a corresponding LED string voltage, and further wherein the second secondary winding comprises a turns ratio relative to the primary winding to generate the corresponding LED string voltage; and
at least one transistor selected from a field effect transistor (FET) and a bipolar junction transistor (BJT), wherein the at least one transistor operates only in its linear region to regulate the second LED string current independent of the first LED string current.

8. The LED driver according to claim 7, wherein the at least one transistor is in series with the second LED string.

9. The LED driver according to claim 7, wherein the at least one transistor comprises a control node that is driven via a voltage signal to control the second LED string current.

10. The LED drive according to claim 7, wherein the second secondary winding further generates a scaled voltage relative to a first LED string voltage such that the scaled voltage equals a voltage drop associated with the second LED string, and further wherein the first LED string voltage is different from the scaled voltage.

11. A light emitting diode (LED) driver comprising:
an inverter for converting a DC input signal to a pulsating signal;
a multi-resonant converter comprising a transformer with a primary winding coupled to the inverter, a first secondary winding for generating a first LED string current in response to the pulsating signal, and a second secondary winding for generating a second LED string current in response to the pulsating signal, wherein the second LED string is responsive to a corresponding LED string voltage, and further wherein the second secondary winding generates a scaled output voltage relative to an output voltage generated by the first secondary winding, such that the scaled output voltage equals the corresponding LED string voltage; and
at least one transistor selected from a field effect transistor (FET) and a bipolar junction transistor (BJT), wherein the at least one transistor operates only in its linear region to regulate the second LED string current independent of the first LED string current.

12. The LED driver according to claim 11, wherein the at least one transistor is in series with the second LED string.

13. The LED driver according to claim 11, wherein the at least one transistor comprises a control node that is driven via a voltage signal to control the second LED string current.

14. The LED driver according to claim 11, wherein the second secondary winding generates a scaled output voltage relative to the first secondary output voltage such that the scaled output voltage equals a voltage drop associated with the second LED string, and further wherein the first secondary output voltage is different from the scaled output voltage.

* * * * *